(12) United States Patent
Pichler

(10) Patent No.: US 12,455,205 B2
(45) Date of Patent: Oct. 28, 2025

(54) METHOD AND DEVICE FOR PRESSURE-SENSOR DIAGNOSIS IN A TANK-VENTING SYSTEM OF A MOTOR VEHICLE OPERATED BY AN INTERNAL COMBUSTION ENGINE

(71) Applicant: Vitesco Technologies GmbH, Regensburg (DE)

(72) Inventor: Thomas Pichler, Hohenau (DE)

(73) Assignee: Vitesco Technologies GmbH, Regensburg (DE)

( * ) Notice: Subject to any disclaimer, the term of this patent is extended or adjusted under 35 U.S.C. 154(b) by 12 days.

(21) Appl. No.: 18/359,049

(22) Filed: Jul. 26, 2023

(65) Prior Publication Data
US 2023/0375429 A1    Nov. 23, 2023

Related U.S. Application Data

(63) Continuation of application No. PCT/EP2022/050951, filed on Jan. 18, 2022.

(30) Foreign Application Priority Data
Jan. 26, 2021    (DE) ............... 10 2021 200 667.1

(51) Int. Cl.
G01L 27/00    (2006.01)
F02M 25/08   (2006.01)

(52) U.S. Cl.
CPC ....... *G01L 27/007* (2013.01); *F02M 25/0809* (2013.01); *F02M 25/0854* (2013.01); *F02M 25/0872* (2013.01)

(58) Field of Classification Search
CPC .............. G01L 27/007; F02M 25/0809; F02M 25/0854; F02M 25/0872
See application file for complete search history.

(56) References Cited

U.S. PATENT DOCUMENTS 6,363,921 B1 *   4/2002   Cook ................. F02M 25/0836
                                                      123/519
7,810,475 B2 *  10/2010   Peters ................ F02M 25/089
                                                      123/519

(Continued)

FOREIGN PATENT DOCUMENTS

DE   102011084403 A1   4/2013
DE   112017001972 T5   1/2019
DE   102018219335 A1   6/2019

OTHER PUBLICATIONS

International Search Report and Written Opinion dated May 10, 2022 from corresponding International Patent Application No. PCT/EP2022/050951.

(Continued)

*Primary Examiner* — Phutthiwat Wongwian
*Assistant Examiner* — Susan E Scharpf

(57) ABSTRACT

A method and a device for pressure sensor diagnosis in a tank venting system of a motor vehicle operated by an internal combustion engine is disclosed. The tank venting system includes an activated carbon filter, a purge line arranged between the activated carbon filter, and an intake tract of the motor vehicle. A tank venting valve is arranged in the purge line and a pressure sensor is arranged in the purge line. The method includes measuring a pressure prevailing in the purge line by way of the pressure sensor to determine a starting pressure, classifying the starting pressure into one of a plurality of pressure ranges depending on the amplitude of the starting pressure, and carrying out a pressure sensor diagnosis using a diagnosis algorithm which is associated with the pressure range in which the starting pressure lies.

14 Claims, 8 Drawing Sheets

(56) References Cited

U.S. PATENT DOCUMENTS

| | | | | |
|---|---|---|---|---|
| 8,312,765 B2* | 11/2012 | Pursifull | ............ | F02M 25/0809 |
| | | | | 73/114.39 |
| 9,551,304 B2* | 1/2017 | Haefele | .............. | F02M 25/0809 |
| 10,138,846 B1* | 11/2018 | Dudar | ..................... | F02D 41/22 |
| 11,359,582 B1* | 6/2022 | Dudar | ................ | F02M 25/0836 |
| 11,480,137 B1* | 10/2022 | Dudar | ................ | F02M 25/0809 |
| 2005/0044938 A1* | 3/2005 | Tsuruta | ............. | F02M 25/0818 |
| | | | | 73/114.39 |
| 2014/0345574 A1* | 11/2014 | Haefele | .............. | F02M 25/0809 |
| | | | | 73/114.39 |
| 2018/0187614 A1* | 7/2018 | Dudar | ................... | F02D 41/004 |
| 2019/0145354 A1* | 5/2019 | Kato | .................. | F02M 25/0836 |
| | | | | 123/520 |
| 2019/0186423 A1* | 6/2019 | Choi | .................. | F02M 25/0872 |
| 2019/0242310 A1* | 8/2019 | Dudar | ................ | F01M 13/0011 |
| 2022/0222986 A1* | 7/2022 | Dudar | ................ | G01C 21/3461 |
| 2023/0375429 A1* | 11/2023 | Pichler | ............... | F02M 25/0872 |

OTHER PUBLICATIONS

German Office Action dated Sep. 15, 2021 for corresponding German Patent Application No. 10 2021 200 667.1.

* cited by examiner

FIG 1 - Prior Art

METHOD AND DEVICE FOR PRESSURE-SENSOR DIAGNOSIS IN A TANK-VENTING SYSTEM OF A MOTOR VEHICLE OPERATED BY AN INTERNAL COMBUSTION ENGINE

CROSS-REFERENCE TO RELATED APPLICATIONS

This application claims the benefit of PCT Application PCT/EP2022/050951, filed Jan. 18, 2022, which claims priority to German Application 10 2021 200 667.1, filed Jan. 26, 2021. The disclosures of the above applications are incorporated herein by reference.

TECHNICAL FIELD

The disclosure relates to a method and to a device for pressure sensor diagnosis in a tank venting system of a motor vehicle operated by an internal combustion engine.

BACKGROUND

In order to limit pollutant emissions, modern motor vehicles which are driven by an internal combustion engine are equipped with tank venting systems. The purpose of such systems is to accommodate and temporarily store fuel vapor which forms in a fuel tank due to evaporation, such that the fuel vapor cannot escape into the environment. An activated carbon filter is preferably used as the store for the fuel vapor. This has only a limited storage capacity for fuel vapor. In order to use the activated carbon filter over a long period of time, it has to be regenerated. To this end, a controllable tank venting valve, which is opened to carry out the regeneration, is arranged in a line between the activated carbon filter and an inlet manifold of the internal combustion engine. As a result, the fuel vapors stored in the activated carbon filter escape into the inlet manifold due to a negative pressure in this inlet manifold, so that the capacity of the activated carbon filter to absorb fuel vapor is restored.

A tank venting system is illustrated in FIG. 1. The system inter alia, includes the following components: an activated carbon filter 3, in which hydrocarbons outgassed from a fuel tank 5 are bound; an inlet manifold 19, into which a purge mass flow extracted from the activated carbon filter 3 is conducted via a purge line 13, 14, 15, 18; a tank venting valve 6 arranged in the purge line 13 between the activated carbon filter 3 and the inlet manifold 19; and an engine control ECU, which actuates the tank venting valve 6 by way of a pulse width modulated control signal (PWM signal).

The system also includes: a branching of the purge line, downstream of the tank venting valve 6, into a full-load venting path 14 and a low-pressure venting path 15, which lead into the inlet manifold 19 at different discharge points, where one discharge point is provided between an air filter 20 and the compressor 21 of a turbocharger and the other discharge point is provided downstream of a throttle valve 22; a Venturi nozzle 9, which is arranged in the full-load venting path 14 and which generates a necessary differential pressure across the full-load venting path in the case of boost pressures above ambient level and an unthrottled engine operation; and a pressure sensor 4, which is arranged in the purge line 13 between the activated carbon filter 3 and the tank venting valve 6 and is designed to carry out a line diagnosis of the full-load venting path.

The system also includes: a tank leakage diagnosis component 2, which is designed to carry out a tank leakage diagnosis and is embodied, for example, as an electric pump unit; an injection system 23, which injects a fuel quantity, determined by the engine control ECU, into the cylinders of the internal combustion engine; a lambda sensor 24 for determining the residual oxygen content in the exhaust gas of the internal combustion engine; a non-return valve 7 in the full-load venting path 14; and a non-return valve 8 in the low-pressure venting path 15.

The engine control ECU is provided, inter alia, for: determining a setpoint value for the purge flow for a current operating state of the internal combustion engine; determining a manifold pressure in the intake tract with the aid of a pressure sensor 17; determining a PWM value for actuating the tank venting valve from the pressure gradient between the ambient pressure and the pressure at the respective discharge point from the predetermined purge flow; and determining the fuel quantity to be injected for the current operating state of the internal combustion engine.

The engine control ECU is also provided for: determining, for the two above-mentioned discharge points, the dead time of the gas flow supplied for combustion through the opening of the tank venting valve 6; and calculating a fuel adjustment on the basis of the hydrocarbon concentration of the purge mass flow learned via a lambda controller deviation.

In accordance with country-specific legal specifications, it is necessary to ensure the functionality of the tank venting system. This requires a diagnosis of the tank venting system. It is detected that a functional tank venting system is present if a sufficiently high mass flow rate from the activated carbon filter 3 to the intake tract 19 of the internal combustion engine is ensured in order to keep the hydrocarbon emissions from the tank venting system as low as possible. In the context of this diagnosis, the operating ability of the purge line 13 upstream of the pressure sensor 4, of the full-load venting path 14, of the low-pressure venting path 15, of a high-pressure line 16 leading to the Venturi nozzle 9, of a purge line 18 downstream of the pressure sensor 4, of the tank venting valve 6, of the non-return valve 7 arranged in the full-load venting path 14, of the non-return valve 8 arranged in the low-pressure venting path 15 and of the Venturi nozzle 9 should be checked.

The output signals of the pressure sensor 4 arranged in the purge line 13 between the activated carbon filter 3 and the tank venting valve 6 are used for this diagnosis. During the diagnostic procedure, to ascertain the functionality of the tank venting system, the output signals provided by the pressure sensor 4 are analyzed either during suitable actuation states of the tank venting valve 6 when the tank venting function is active or after actively introducing line pressure changes through suitable actuation of the tank venting valve.

A functional pressure sensor 4 therefore forms a basis for making an accurate diagnosis of the tank venting system. If faultless operation of the pressure sensor 4 is not ensured before starting the internal combustion engine and also during a tank venting system diagnosis, this may lead to inadequate results. Therefore, in the context of interpreting the results of the tank venting line diagnosis, the following eventualities may arise if a pressure sensor fault has occurred: defective purge line components are detected; and the diagnosis is concluded with the result: "system functional".

Both above-mentioned results may be incorrect and may not accurately describe the actual system state.

To avoid such incorrect results, and to ascertain the functionality of the pressure sensor in the purge line of a tank venting system, it is known to diagnose freezing, on the one hand, and an offset, on the other. In the case of freezing, which is referred to below as sticking pressure sensor fault, the pressure sensor continuously emits a constant signal. In the case of an offset, which is referred to below as pressure sensor offset fault, the pressure sensor indicates a value which is higher or lower than an actual pressure. Freezing of the pressure sensor is checked by waiting for states in the tank venting system in which the pressure sensor would output a pressure change in the fault-free state. To determine a pressure sensor offset, the pressure signal in the purge line is compared to a signal from a further ambient pressure sensor when the internal combustion engine is at a standstill.

Disadvantages of the procedure described above exist in that, in various pressure sensor regions, it is not possible to distinguish between the occurrence of a purge line fault and the occurrence of a pressure sensor fault, since identical pressure signal states or pressure histories may be generated in the event of a fault.

SUMMARY

The disclosure provides a method and a device for pressure sensor diagnosis in a tank venting system of a motor vehicle operated by an internal combustion engine, in which the disadvantages described above do not arise.

A first aspect of the disclosure provides a method for pressure sensor diagnosis in a tank venting system of a motor vehicle operated by an internal combustion engine, where the tank venting system includes an activated carbon filter, a purge line arranged between the activated carbon filter and an intake tract of the motor vehicle, a tank venting valve arranged in the purge line and a pressure sensor arranged in the purge line. The following steps are carried out: measuring a pressure prevailing in the purge line by means of the pressure sensor to determine a starting pressure, classifying the starting pressure into one of a plurality of pressure ranges depending on the amplitude of the starting pressure, and carrying out a pressure sensor diagnosis with a diagnosis algorithm which is associated with the pressure range in which the starting pressure lies.

The advantages of the disclosure provide that the diagnosis may be carried out without actively interfering in the tank venting function. This is advantageous in that the tank venting purge rate is increased during the driving cycle. The execution logic of the diagnosis furthermore ensures precise differentiation between the occurrence of a pressure sensor fault and a fault of a line portion or a fault of a component arranged in the purge line. A further advantage is that, to carry out the described diagnosis, it is not necessary to interrupt competing diagnosis functions, for example a lambda probe diagnosis or a catalyst diagnosis. Impacts on driveability and emissions caused by actively reducing actuation profiles for the tank venting valve are eliminated. The pressure sensor diagnosis may also be performed with a high concentration of the purge medium, since the conclusion of the pressure sensor diagnosis is already possible with a low actuation height of the tank venting valve and the associated purge line pressure changes in the nominal system.

In some implementations, the starting pressure is classified into one of a plurality of ranges including a positive pressure range, an ambient pressure range and a negative pressure range.

In some examples, the diagnosis algorithm associated with the positive pressure range determines whether a pressure sensor offset fault or a sticking pressure sensor fault has occurred.

In some implementations, the diagnosis algorithm associated with the positive pressure range includes the following steps: suspecting that a pressure sensor offset fault has occurred, observing a minimum actuation of the tank venting valve with an actuation value which is greater than a predetermined first threshold value, and checking whether a pressure gradient generated across the tank venting valve as a result of the minimum actuation is greater than a second predetermined threshold value.

The diagnosis algorithm also includes: detecting that a pressure sensor offset fault has occurred if the check reveals that the pressure gradient generated across the tank venting valve as a result of the minimum actuation is greater than the predetermined second threshold value, and detecting that a sticking pressure sensor fault has occurred if the check reveals that the pressure gradient generated across the tank venting valve as a result of the minimum actuation is not greater than the predetermined second threshold value.

In some examples, the diagnosis algorithm associated with the positive pressure range determines whether the pressure sensor is operating faultlessly or has a pressure sensor offset fault or a sticking pressure sensor fault.

In some implementations, it is determined whether the region of the purge line which lies upstream of the pressure sensor is blocked.

In some examples, the diagnosis algorithm associated with the negative pressure range includes the following steps: suspecting that a pressure sensor offset fault has occurred, checking whether the pressure downstream of the tank venting valve is different from the starting pressure, integrating the tank venting volume flow during an uninterrupted active tank venting valve actuation until the volume present in the purge line up to the activated carbon filter is reached, and checking whether the difference between the purge line pressure and the pressure downstream of the tank venting valve is less than a predetermined third threshold value. The diagnosis algorithm also includes: if this is the case, detecting that a functional pressure sensor is present; if this is not the case, checking whether the maximum value of the difference between the purge line pressure and the starting pressure is greater than a predetermined fourth threshold value; if this is not the case, detecting that a sticking pressure sensor fault has occurred; if this is the case, waiting until the tank venting valve is closed for a minimum adjustment time; checking whether the difference between the purge line pressure and the starting pressure is less than a predetermined fifth threshold value; if this the case, detecting that a pressure sensor offset fault has occurred; and if this is not the case, detecting that a sticking pressure sensor fault has not occurred.

In some implementations, the diagnosis algorithm associated with the ambient pressure range determines whether a sticking pressure sensor fault has occurred.

In some examples, when determining whether a sticking pressure sensor fault has occurred, an analysis of one or more events which cause a pressure change in the purge line in the nominal system is performed.

In some implementations, when determining whether a sticking pressure sensor fault has occurred, it is checked whether the difference between the purge line pressure and the starting pressure is greater than a predetermined sixth threshold value.

In some examples, if it is detected that the difference between the purge line pressure and the starting pressure is greater than a predetermined sixth threshold value, it is detected that a sticking pressure sensor fault has not occurred.

In some implementations, if it is detected that the difference between the purge line pressure and the starting pressure is not greater than a predetermined sixth threshold value, it is detected that a sticking pressure sensor fault has occurred.

Another aspect of the disclosure provides a device having a control unit, which is designed to control a method according to the first aspect of the disclosure.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
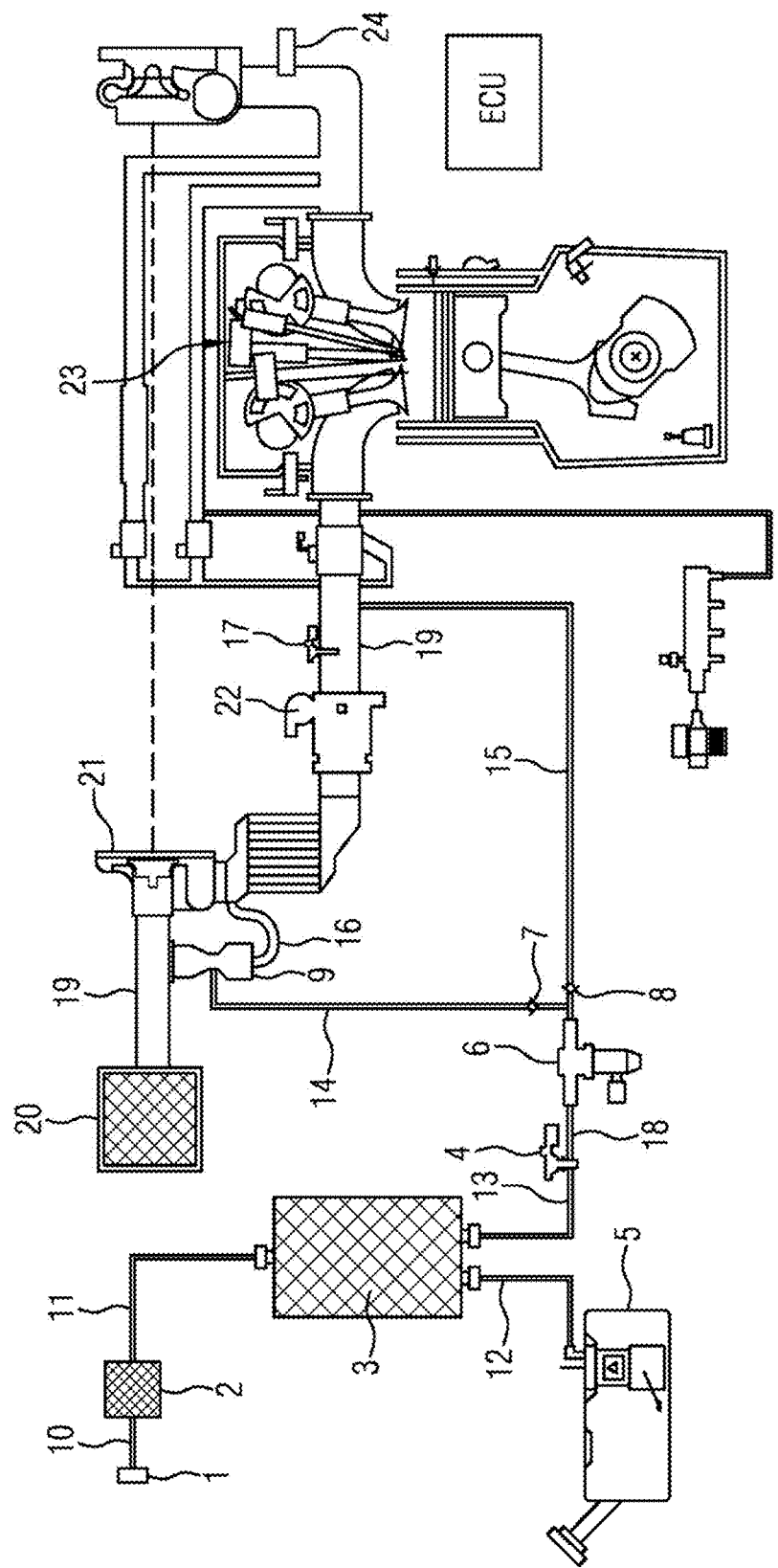
FIG. 1 shows a sketch of a device for pressure sensor diagnosis in a tank venting system of a motor vehicle operated by an internal combustion engine.

To describe the disclosure, possible pressure signal states in the event that purge line faults have occurred are firstly discussed based on the device shown in FIG. 1.

In the tank venting system illustrated in FIG. 1, the following fault states or symptoms can be seen, which affect the curve of the pressure sensor signal.

Figure 2:
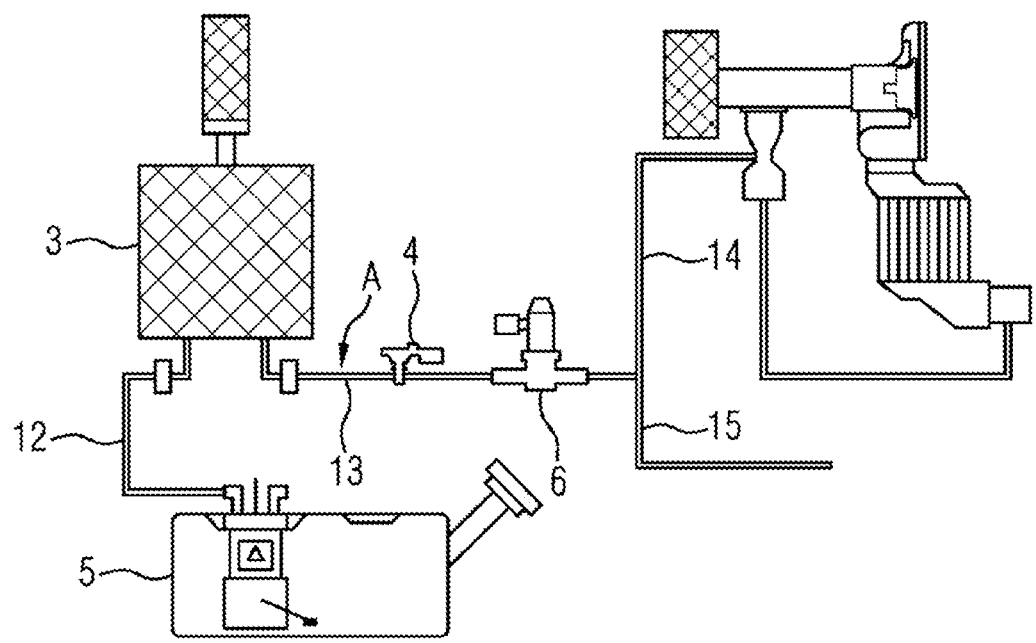
FIG. 2 shows a sketch of a subregion of FIG. 1 to illustrate a fault symptom A (purge line upstream of the pressure sensor is blocked)

The purge line 13 is obstructed (symptom A) in the region upstream of the tank venting valve 6 which is denoted by the letter "A" in FIG. 2:
if the purge line 13 is blocked in the region A between the activated carbon filter 3 and the tank venting valve 6, then, after opening the tank venting valve 6, a pressure is generated at the pressure sensor 4 which corresponds to the pressure in the currently active purge line region downstream of the tank venting valve 6, i.e., the pressure in the full-load venting path 15 or the pressure in the low-pressure venting path 14. If the tank venting valve 6 is closed during or after the operation of the internal combustion engine, then the pressure remains at the most recent pressure level prevailing under the active tank venting valve actuation. The behavior described makes it impossible to distinguish a pressure sensor offset fault from an obstructed purge line upstream of the pressure sensor directly after starting the internal combustion engine with the tank venting valve 6 continuously closed. A pressure which is accidentally output constantly (sensor "sticking") at the pressure level reached when performing the diagnosis to ascertain the functionality of the region A in FIG. 2 would furthermore lead to a misinterpretation.

Figure 3:
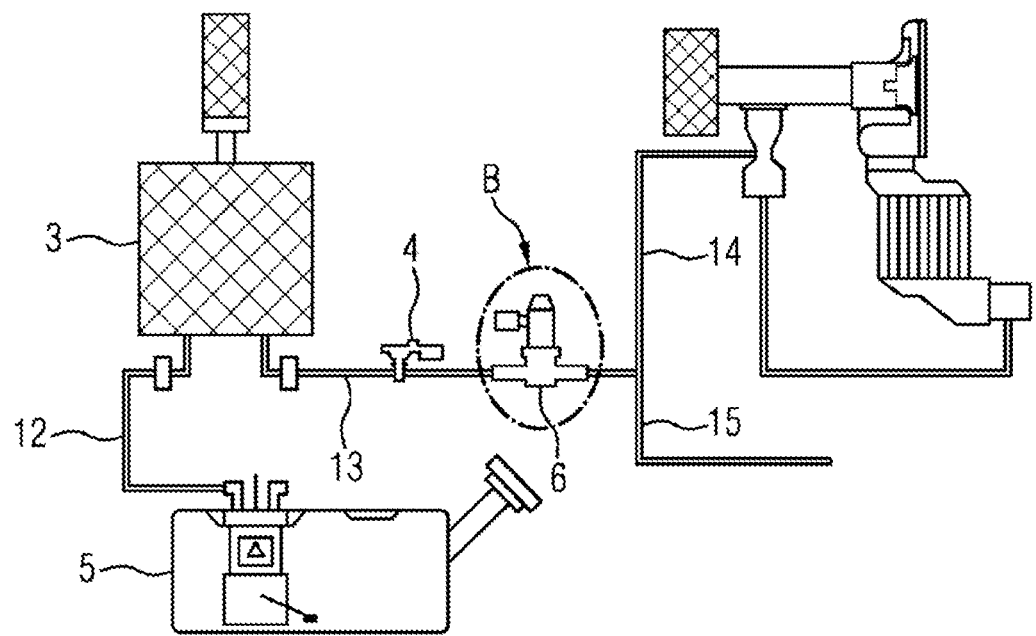
FIG. 3 shows a sketch of a subregion of FIG. 1 to illustrate a fault symptom B (tank venting valve is jammed open)

The tank venting valve 6 jams in the open state, as indicated by the letter "B" in FIG. 3 (symptom B).

If the tank venting valve 6 is jammed open, a pressure gradient between the pressure at the pressure sensor 4 and the ambient pressure is already generated in the non-actuated state when the internal combustion engine is active. If the pressure sensor has a signal offset which is at the level of the pressure gradient in the case of the described fault (symptom B), then it is not possible to differentiate between the occurrence of a purge line fault and the occurrence of a pressure sensor fault. The same also applies to a pressure signal which is output constantly (sensor "sticking") at the pressure level of the pressure gradient in the case of this fault (symptom B).

Figure 4:
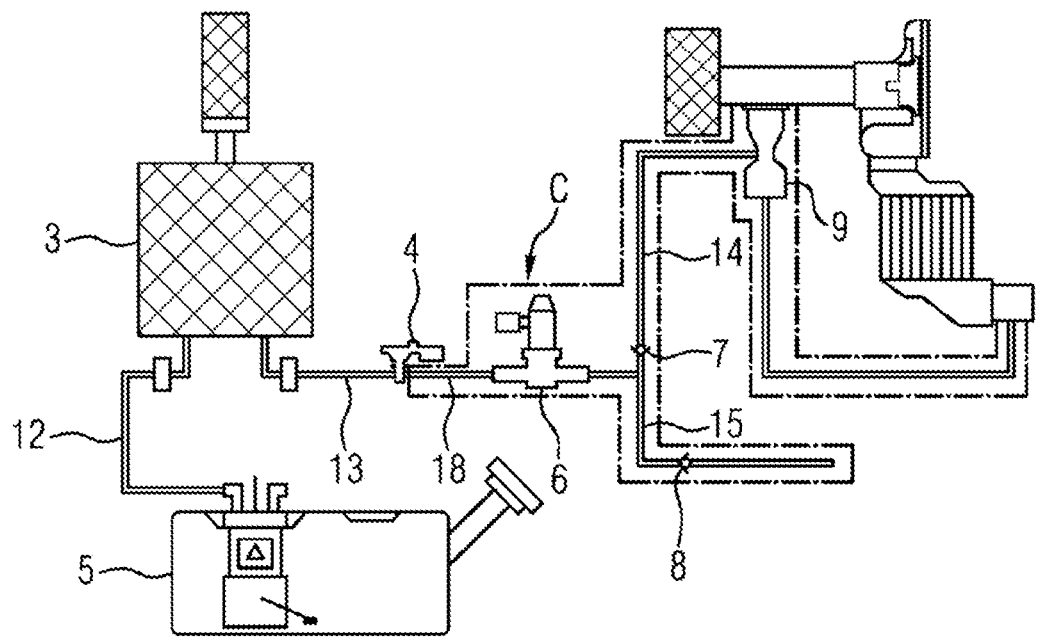
FIG. 4 shows a sketch of a subregion of FIG. 1 to illustrate a fault symptom C (purge line between pressure sensor and tank venting valve is blocked/tank venting valve is jammed shut/purge line components downstream of the tank venting valve are blocked or open to the environment, FIG. 5 shows a chart illustrating the categorization of the purge line pressure, FIG. 6 shows a sketch illustrating the breakdown of the pressure sensor diagnosis into the diagnosis algorithms associated with the pressure ranges, FIG. 7 shows a flow chart of the diagnosis algorithm associated with the pressure range W, FIG. 8 shows a flow chart of the diagnosis algorithm associated with the pressure range X, FIG. 9 shows a flow chart of the diagnosis algorithm associated with the pressure range Y, FIG. 10 shows a flow chart illustrating further events which may be analyzed to detect a sticking pressure sensor fault, and FIG. 11 shows a flow chart of the diagnosis algorithm associated with the pressure range Z.

The purge line 18 upstream of the tank venting valve 6 is blocked. The tank venting valve 6 jams in the closed state. The components 7, 8, 9, 14, 15, 16 of the purge line system which are arranged downstream of the tank venting valve 6 are blocked or are open to the environment (symptom C), as indicated by the letter "C" in FIG. 4.

If a mass flow through the tank venting system cannot be realized due to this system fault, then a pressure gradient at the sensor 4 compared to the ambient pressure is not generated during active actuation of the tank venting valve 6. If a pressure signal which is close to the ambient pressure is emitted constantly (sensor "sticking"), it is again not possible to differentiate between the occurrence of a purge line fault and a pressure sensor fault.

The potential overlap of diagnosis results based on the system and pressure sensor states explained above shall be illustrated with reference to the following Table 1.

TABLE 1

|  |  | Pressure sensor | |
|---|---|---|---|
|  |  | Sensor Stuck | Sensor Offset |
| Purge line | Symptom A | X | X |
|  | Symptom B | Y | Y |
|  | Symptom C | W/Z | — |

Figure 5:
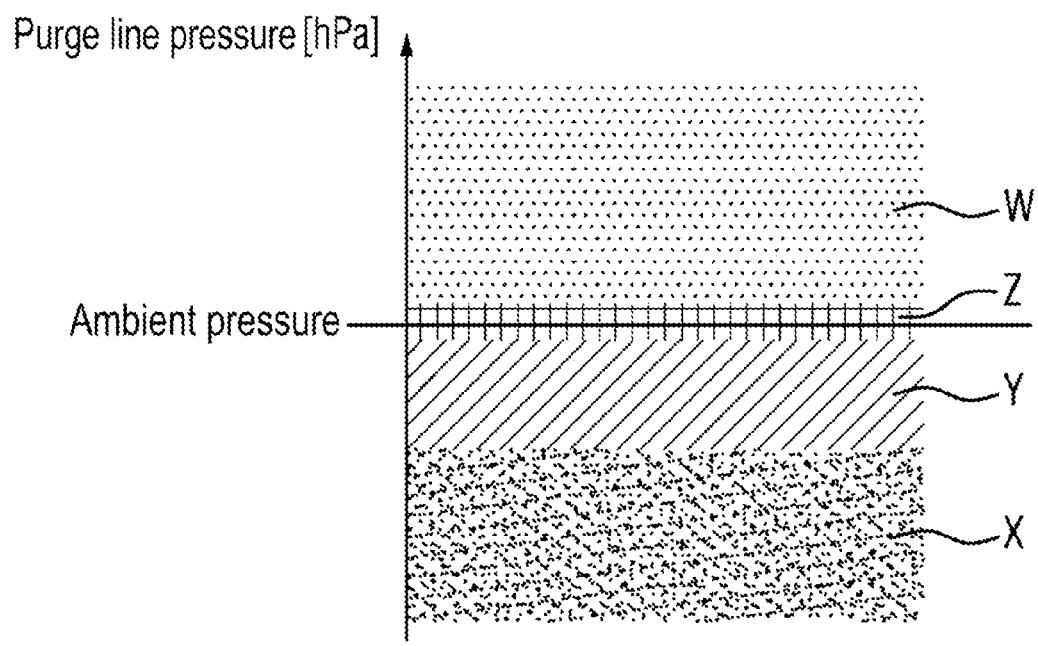

To solve the described overlap of diagnosis results and enable the genuinely faulty components in the tank venting system to be pinpointed accurately, a diagnosis sequence for ascertaining the functionality of the pressure sensor 4 is described below, in which the pressure measured by the pressure sensor 4 is categorized into different ranges W, X, Y, Z directly after the engine control unit is switched on, as illustrated in FIG. 5.

In this FIG. 5, the purge line pressure is plotted upwards and the time t is plotted to the right. The range W corresponds to a positive pressure range in which the purge line pressure is above an ambient pressure range Z. The range X corresponds to a negative pressure range in which the purge line pressure is below the ambient pressure range Z, where a further negative pressure range Y is located between the negative pressure range X and the ambient pressure range Z.

A diagnosis principle, via which the functionality of the pressure sensor 4 may be ascertained, is explained below with reference to FIGS. 6-11.

Figure 6:
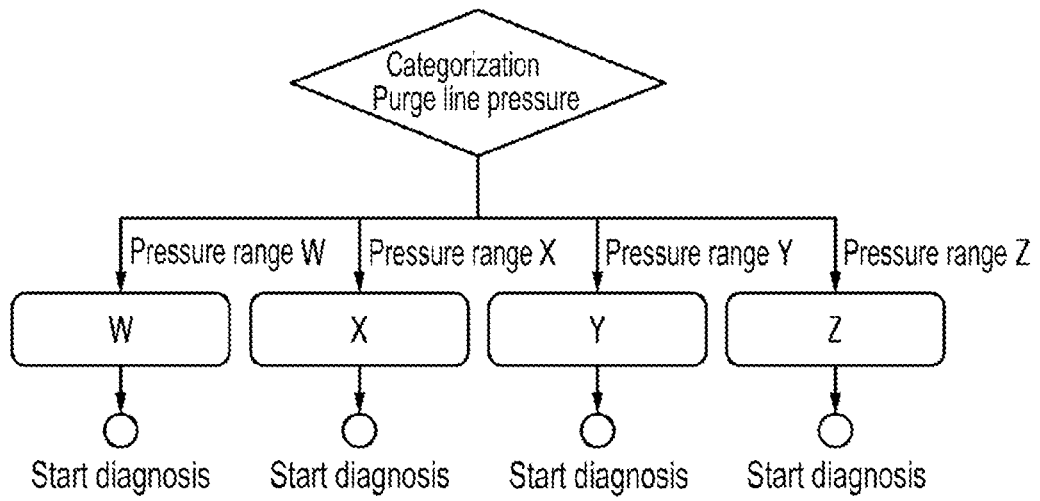

FIG. 6 shows that, after the engine control is switched on, a pressure sensor signal is measured in the purge line by the pressure sensor 4 and the measured purge line pressure is categorized based on this pressure sensor signal. During this categorization, the pressure sensor signal, which corresponds to the measured purge line pressure and is referred to below as the starting pressure, is associated with the relevant pressure range W, Z, Y or Z in each case and saved. The diagnosis then starts.

Figure 7:
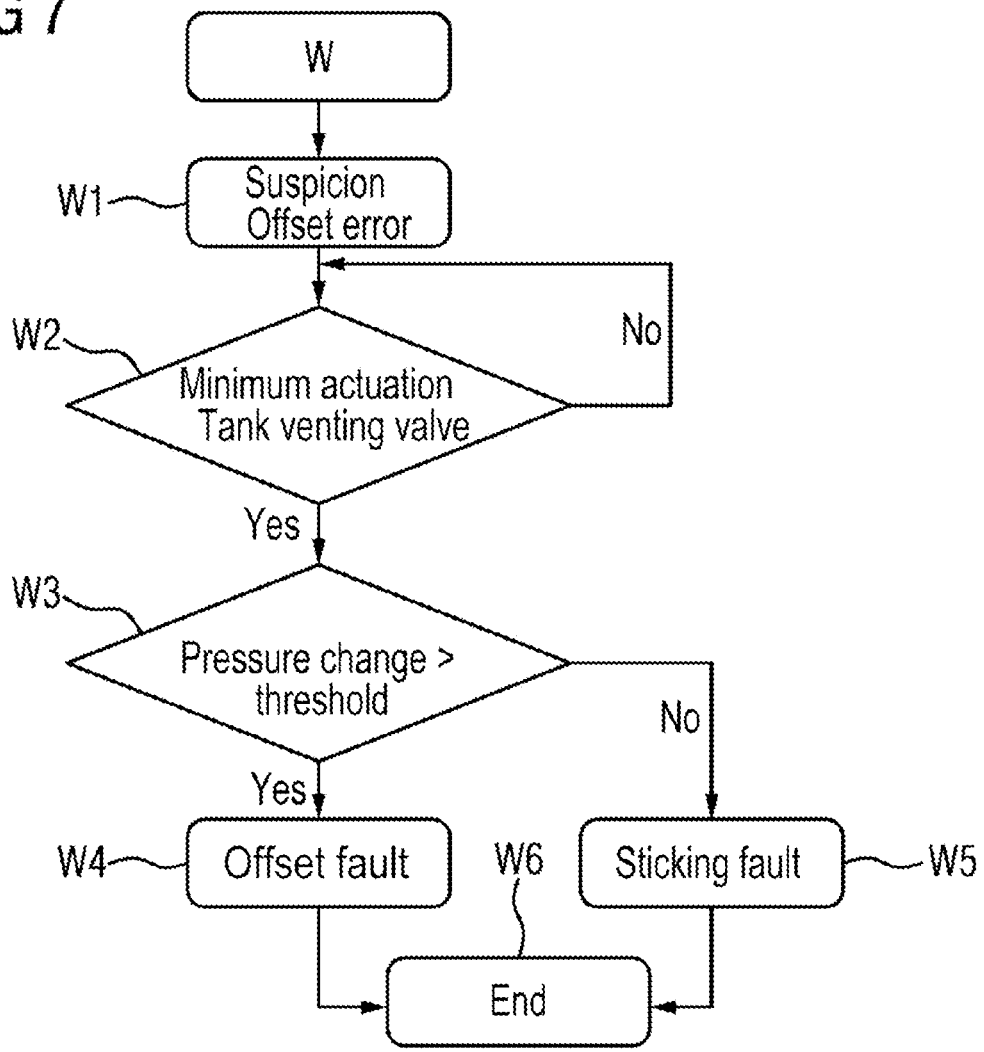

FIG. 7 shows a flow chart showing the diagnosis sequence when the starting pressure is in the positive pressure range W. The starting pressure is in the positive pressure range if, after subtracting the ambient pressure value, the pressure value measured by the pressure sensor is greater than a predetermined adjustable threshold:

$$p-p1>sw.$$

In this case, p is the measured pressure value, p1 is the ambient pressure value and sw is the predetermined threshold.

If the starting value is in the positive pressure range, then, directly after the engine control is switched on, it is suspected in step W1 that a pressure sensor offset fault has occurred since a pressure signal cannot be greater than the ambient pressure, even with a blocked purge line upstream of the pressure sensor 4, since only negative pressures occur downstream of the tank venting valve 6 when the internal combustion engine is active. In the further course of the diagnosis, to distinguish between the occurrence of a pressure sensor offset fault and a sticking pressure sensor fault, step 2 waits for a minimum actuation of the tank venting valve 6 with a minimum required pressure gradient across the tank venting valve 6. It is checked here whether the actuation value of the tank venting valve and also the pressure gradient, i.e., the difference between the ambient pressure and the prevailing pressure (pressure in the low-pressure or high-pressure purge line) downstream of the tank venting valve, is greater than a predetermined threshold. In a further step W3, the pressure change (p0−p>sw) which occurs during the active minimum actuation of the tank venting valve is compared to a minimum threshold, with p corresponding to the measured pressure value and p0 to the starting value.

If the pressure change described above does not reach the minimum threshold, then the process continues to a step W4, in which the occurrence of a pressure sensor offset fault is registered. The process then continues to a step W6, with which the method is ended.

However, if the pressure change described above reaches the minimum threshold, then the process continues to a step W5, in which the occurrence of a sticking pressure sensor fault is registered. The process then continues to step W6, with which the method is ended.

Figure 8:
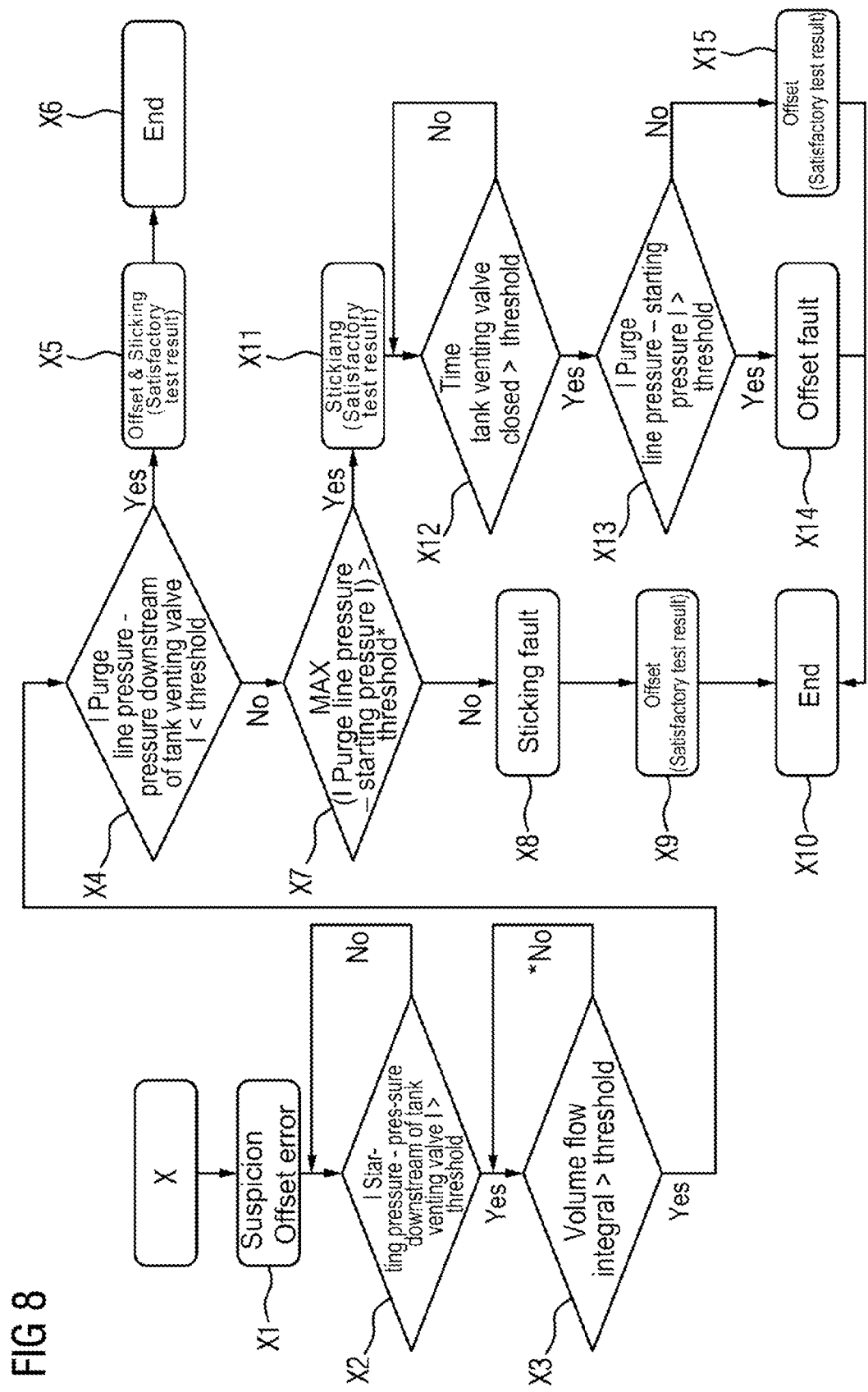

FIG. 8 shows a flow chart showing the diagnosis sequence when the starting pressure is in the negative pressure range X. The starting pressure is in the negative pressure range if the difference between the ambient pressure and the pressure value measured by the pressure sensor is greater than a predetermined adjustable threshold:

If the starting value is in the negative pressure range X, then, directly after the engine control is switched on, it is suspected in step X1 that a pressure sensor offset fault has occurred. The absolute starting pressure must therefore be lower than the minimum pressure that would be generated if the tank venting valve 6 were jammed open. The aim of this diagnosis is to distinguish a blocked purge line 13 upstream of the pressure sensor 4 from a sticking pressure sensor fault and a pressure sensor offset fault. To this end, the tank venting volume flow is firstly integrated during an uninterrupted active tank venting valve actuation until the volume present in the purge line 13 to the activated carbon filter 3 is reached. The pressure downstream of the tank venting valve 6 must be different from the starting pressure here. The following conditions must apply:

$$|\text{starting pressure}-\text{pressure downstream of the tank venting valve}|>\text{adjustable threshold}.$$

Step X2 checks whether this condition is fulfilled. If this condition is not fulfilled, then the process returns to step X2. On the other hand, if this condition is fulfilled, then the process continues to a step X3.

This step X3 checks whether the volume flow integral is greater than a predetermined threshold.

$$\text{Volume flow integral}>\text{threshold}.$$

If this condition is not fulfilled, then the process returns to step X3. On the other hand, if this condition is fulfilled, then the process continues to a step X4.

This step X4 checks whether, after reaching the volume flow integral described above, the purge line pressure measured by the pressure sensor 4 is closer to the pressure downstream of the tank venting valve 6. To this end, the following enquiry is made:

$$|\text{purge line pressure}-\text{pressure downstream of the tank venting valve}|<\text{threshold}.$$

If this enquiry reveals that the difference between the purge line pressure and the pressure downstream of the tank venting valve is lower than the adjustable threshold, then it is concluded in a step X5 that a functional pressure sensor 4 is present and the diagnosis is ended with a satisfactory test result in a step X6.

If this is not the case, then it is necessary to analyze a minimum purge line pressure change when calculating the volume flow integral explained above. To this end, the process continues to a step X7, which checks whether the difference between the purge line pressure and the starting pressure is greater than a threshold:

$$|\text{purge line pressure}-\text{starting pressure}|>\text{threshold}.$$

If the minimum purge line pressure change is not realized, then it is concluded in a step X8 that a sticking pressure sensor fault has occurred. From step X8, the process continues to a step X9 in which it is detected that a pressure sensor offset fault has not occurred. In a following step X10, the method is ended.

On the other hand, if the said minimum purge line pressure change is reached, then it is detected in a step X11 that a sticking pressure sensor fault has not occurred and the process continues to a step X12.

This step X12 waits for the tank venting valve 6 to close for an adjustable minimum time to detect whether a pressure sensor offset fault has occurred. To this end, an enquiry is made in step X12 as to whether the closure time of the tank venting valve is longer than a predetermined threshold. If this is not the case, then the process returns to step X12. On the other hand, if this is the case, the process continues to a step X13.

This step X13 checks whether the generated purge line pressure corresponds to the starting pressure according to the following condition:

|purge line pressure−starting pressure|<adjustable threshold.

If this is not the case, then it is concluded in a step X15 that a pressure sensor offset fault has not occurred. The process then continues to step X10, with which the method is ended.

On the other hand, if this is the case, then it is detected in a step X14 that a pressure sensor offset fault has occurred. The process then continues to step X10, with which the method is ended.

Figure 9:
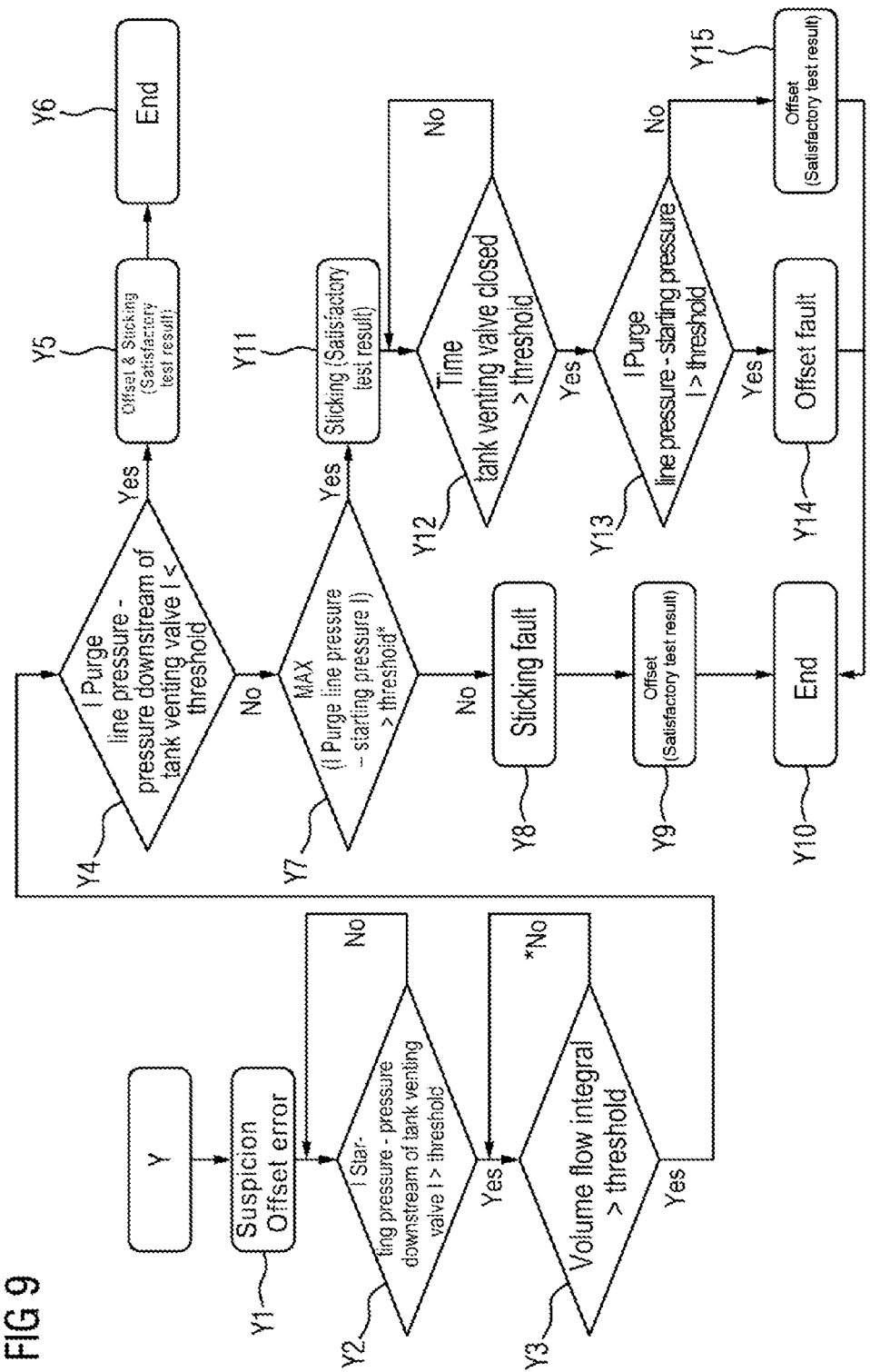

FIG. 9 shows a flow chart showing the diagnosis sequence when the starting pressure is in the negative pressure range Y. If the starting pressure is in this negative pressure range, which extends from the pressure generated in the case of symptom B (ambient pressure−sensor value<predetermined threshold) to the lower limit of the above-mentioned ambient pressure range Z, then the diagnosis sequence for the pressure range Y is started. Essentially, the execution logic for this diagnosis sequence for the pressure range Y is the same as that used for the pressure range X.

If the starting value is in the negative pressure range Y, then, directly after the engine control is switched on, it is suspected in a step Y1 that a pressure sensor offset fault has occurred. Essentially, the execution logic for the diagnosis sequence for the pressure range Y is the same as that for the pressure range X.

To this end, the tank venting volume flow is firstly integrated during an uninterrupted active tank venting valve actuation until the volume present in the purge line 13 up to the activated carbon filter 3 is reached. The pressure downstream of the tank venting valve 6 must be different from the starting pressure here. The following conditions must apply:

|Starting pressure−pressure downstream of the tank venting valve|>threshold.

Step Y2 checks whether this condition is fulfilled. If this condition is not fulfilled, then the process returns to step Y2. On the other hand, if this condition is fulfilled, then the process continues to a step Y3.

This step Y3 checks whether the volume flow integral is greater than a predetermined threshold.

Volume flow integral>threshold.

If this condition is not fulfilled, then the process returns to step Y3. On the other hand, if this condition is fulfilled, then the process continues to a step Y4.

This step Y4 checks whether, after reaching the volume flow integral described above, the purge line pressure measured by the pressure sensor 4 is closer to the pressure downstream of the tank venting valve 6. To this end, the following enquiry is made:

|purge line pressure−pressure downstream of the tank venting valve|<threshold

If this enquiry reveals that the difference between the purge line pressure and the pressure downstream of the tank venting valve is lower than the threshold, then it is concluded in a step Y5 that a functional pressure sensor 4 is present and the diagnosis is ended with a satisfactory test result in a step Y6.

If this is not the case, then it is necessary to analyze a minimum purge line pressure change when calculating the volume flow integral explained above. To this end, the process continues to a step Y7, which checks whether the difference between the purge line pressure and the starting pressure is greater than a predetermined threshold:

|purge line pressure−starting pressure|>threshold.

If the minimum purge line pressure change is not realized, then it is concluded in a step Y8 that a stuck pressure sensor fault has occurred. From step Y8, the process continues to a step Y9 in which it is detected that a pressure sensor offset fault has not occurred. In a following step Y10, the method is ended.

On the other hand, if the minimum purge line pressure change is reached, then it is detected in a step Y11 that a sticking pressure sensor fault has not occurred and the process continues to a step Y12. This step Y12 waits for the tank venting valve 6 to close for an adjustable minimum time to detect whether a pressure sensor offset fault has occurred. To this end, an enquiry is made in step Y12 as to whether the closure time of the tank venting valve is longer than a predetermined threshold. If this is not the case, then the process returns to step Y12. On the other hand, if this is the case, then the process continues to a step Y13.

This step Y13 checks whether the generated purge-line pressure corresponds to the starting pressure according to the following condition:

|purge line pressure−starting pressure|<threshold.

If this is not the case, then it is concluded in a step Y15 that a pressure sensor offset fault has not occurred. The process then continues to step Y10, with which the method is ended.

On the other hand, if this is the case, then it is detected in a step Y14 that a pressure sensor offset fault has occurred. The process then continues to step Y10, with which the method is ended.

Figure 10:
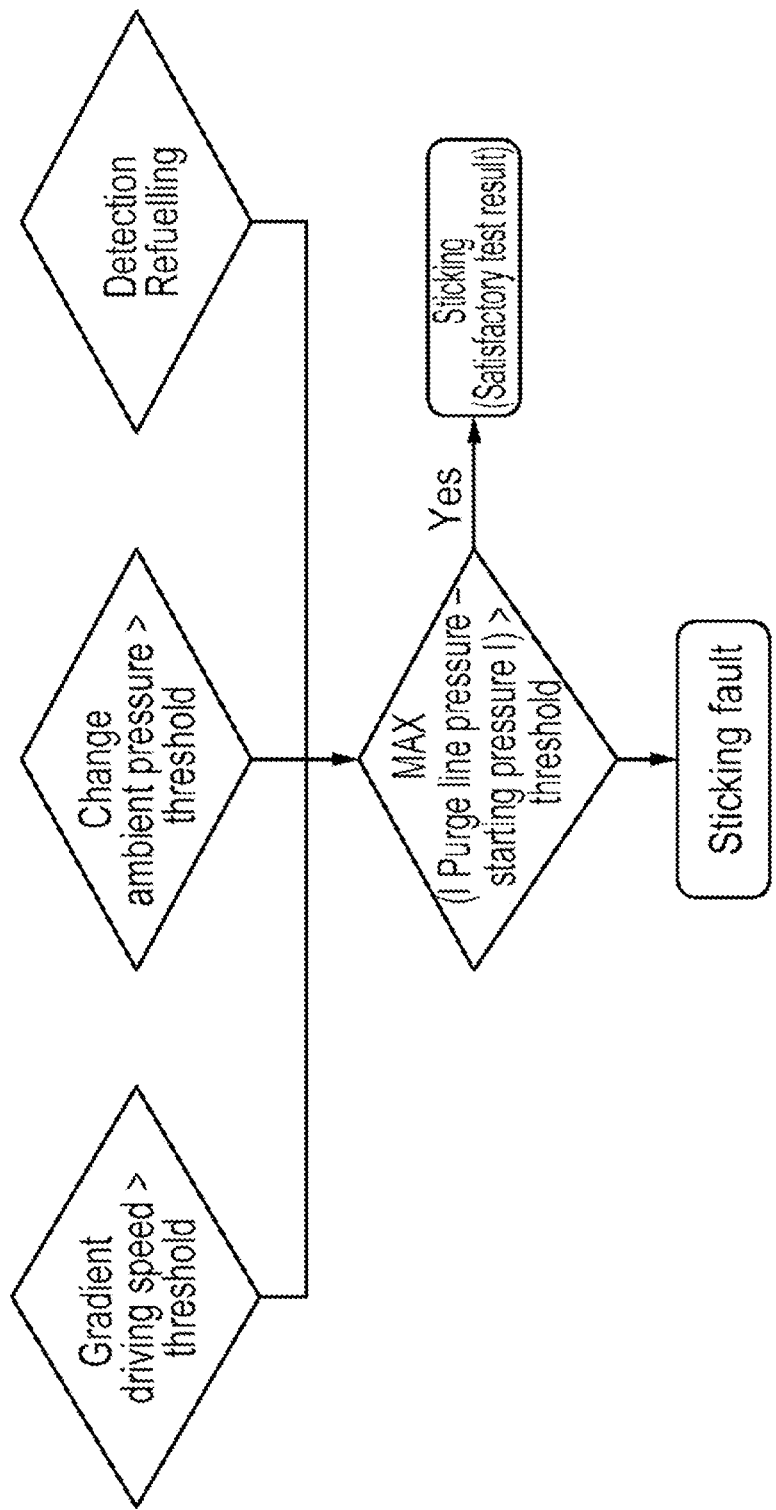

A difference from the method described in FIG. 8 exists in that, in the method described in FIG. 9, the pressure range Y does not contain a pressure level which would lead to a fault entry for a component or a line segment during a purge line diagnosis. It is thus possible to analyze or wait for further events which generate pressure changes in the nominal system before finally detecting if a sticking pressure sensor fault has occurred. Examples of such events are illustrated in FIG. 10.

By way of example, if an enquiry reveals that the gradient of the driving speed is greater than a predetermined threshold, then the process continues to a further enquiry to check whether or not the maximum difference between the purge line pressure and the starting pressure is greater than a predetermined threshold. If this is not the case, then it is concluded that a sticking pressure sensor fault has not occurred. On the other hand, if this is not the case, then it is concluded that a sticking pressure sensor fault has occurred.

By way of example, if an enquiry reveals a change in the ambient pressure which is greater than a predetermined threshold, then the process continues to a further enquiry to check whether or not the maximum difference between the purge line pressure and the starting pressure is greater than a predetermined threshold. If this is not the case, then it is concluded that a stuck pressure sensor fault has not occurred. On the other hand, if this is not the case, then it is concluded that a sticking pressure sensor fault has occurred.

By way of example, if an enquiry reveals that refuelling has taken place, the process continues to a further enquiry to check whether or not the maximum difference between the purge line pressure and the starting pressure is greater than a predetermined threshold. If this is not the case, then it is concluded that a sticking pressure sensor fault has not occurred. On the other hand, if this is not the case, then it is concluded that a sticking pressure sensor fault has occurred.

Figure 11:
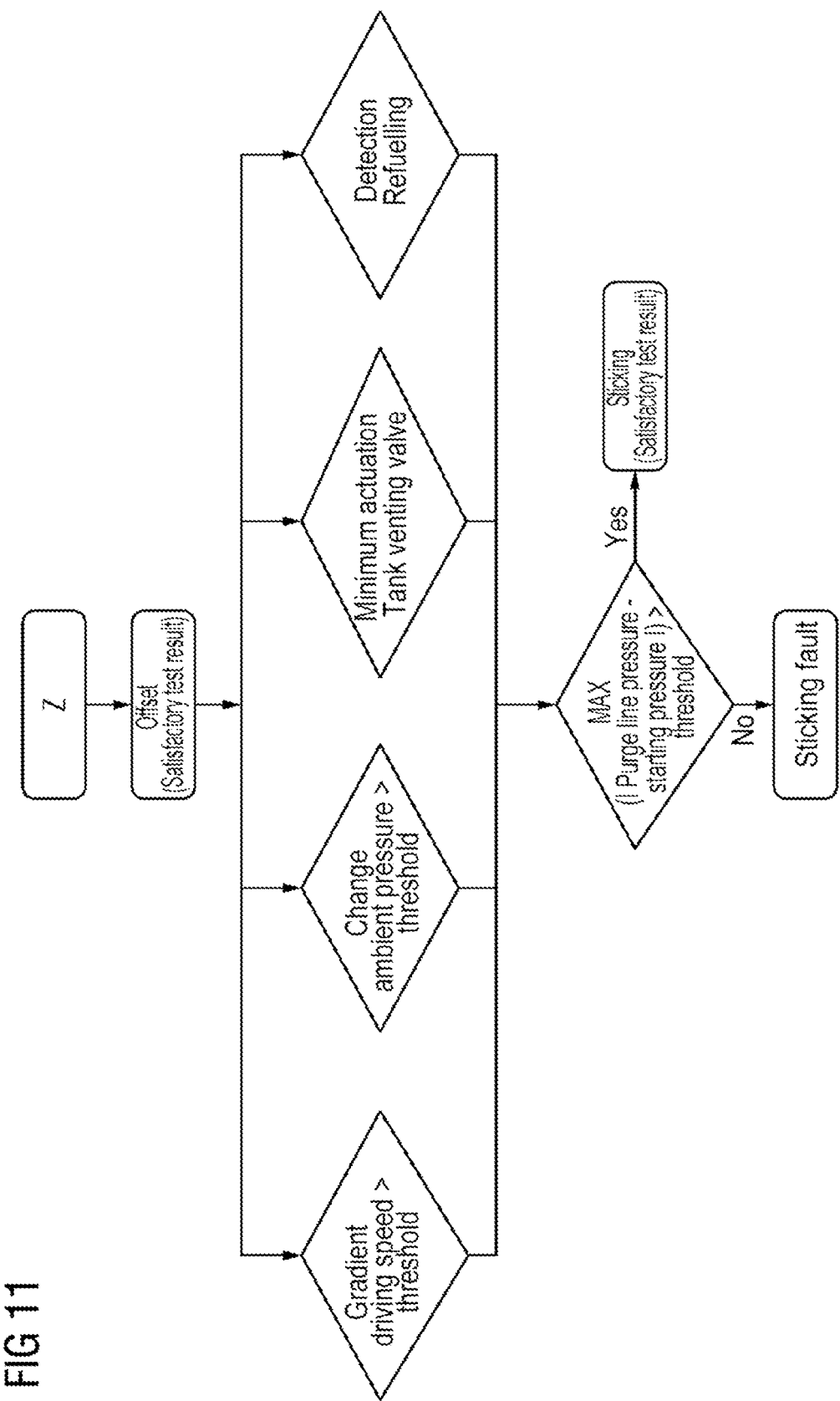

FIG. 11 shows a flow chart showing the diagnosis sequence when the starting pressure is in the ambient pressure range Z. This ambient range Z spans two adjustable pressure thresholds, below and above the currently measured ambient pressure in each case.

If the starting pressure is in the ambient range Z, then a satisfactory test result of the pressure sensor offset diagnosis may be concluded directly after the engine control is switched on. In addition, it is necessary to check whether the pressure sensor signal has frozen. This may take place by observing events which would cause a pressure change in the purge line in the nominal system. Examples of such events are illustrated in FIG. 11. The use of these or other events for checking whether or not a sticking pressure sensor fault has occurred can be selected as required or logically combined as required. This also applies to the events illustrated in FIG. 11.

The thresholds described in connection with FIGS. 7-11 are calibration thresholds, which must be adjustable to adapt the diagnosis function to the underlying system in each case (line lengths, line diameters etc.).

In some examples of the pressure sensor diagnosis, the current diagnostic statuses are synchronized between a purge line diagnosis and a pressure sensor diagnosis to enable optimum coordination of the diagnosis results and accurate pinpointing of faulty system components.

The diagnosis described with reference to the figures may be carried out without active interference in the tank venting function. This is advantageous in that the tank venting purge rate is increased during the driving cycle. The execution logic of the diagnosis furthermore ensures that it is possible to accurately differentiate between the occurrence of a pressure sensor fault and a fault of a line portion of a component arranged in the purge line. A further advantage is that, to carry out the described diagnosis, it is not necessary to interrupt competing diagnosis functions, for example a lambda probe diagnosis or a catalyst diagnosis. Impacts on driveability and emissions caused by actively reducing actuation profiles for the tank venting valve are eliminated. The pressure sensor diagnosis may also be made with a high concentration of the purge medium, since the conclusion of the pressure sensor diagnosis is already possible with a low actuation height of the tank venting valve 6 and the associated purge line pressure changes in the nominal system.

A number of implementations have been described. Nevertheless, it will be understood that various modifications may be made without departing from the spirit and scope of the disclosure. Accordingly, other implementations are within the scope of the following claims.

The invention claimed is:

1. A method for pressure sensor diagnosis in a tank venting system of a motor vehicle operated by an internal combustion engine, the tank venting system includes an activated carbon filter, a purge line arranged between the activated carbon filter and an intake tract of the motor vehicle, a tank venting valve arranged in the purge line and a pressure sensor arranged in the purge line, the method comprises:
    measuring a pressure prevailing in the purge line by the pressure sensor to determine a starting pressure;
    classifying the starting pressure into one of a plurality of pressure ranges depending on an amplitude of the starting pressure, the plurality of pressure ranges includes a positive pressure range, an ambient pressure range and a negative pressure range; and
    carrying out a pressure sensor diagnosis using a diagnosis algorithm which is associated with the pressure range in which the starting pressure lies,
    wherein the diagnosis algorithm associated with the positive pressure range comprises:
        determining whether a pressure sensor offset fault or a sticking pressure sensor fault has occurred;
        suspecting that a pressure sensor offset fault has occurred;
        observing a minimum actuation of the tank venting valve with an actuation value which is greater than a predetermined first threshold value;
        checking whether a pressure gradient generated across the tank venting valve as a result of the minimum actuation is greater than a predetermined second threshold value;
        detecting that a pressure sensor offset fault has occurred if the check reveals that the pressure gradient generated across the tank venting valve as a result of the minimum actuation is greater than the predetermined second threshold value; and
        detecting that a sticking pressure sensor fault has occurred if the check reveals that the pressure gradient generated across the tank venting valve as a result of the minimum actuation is not greater than the predetermined second threshold value.

2. The method of claim 1, wherein the diagnosis algorithm associated with the negative pressure range determines whether the pressure sensor is operating faultlessly or has a pressure sensor offset fault or a sticking pressure sensor fault.

3. The method of claim 2, further comprising determining whether a region of the purge line which lies upstream of the pressure sensor is blocked.

4. The method of claim 2, wherein the diagnosis algorithm associated with the negative pressure range includes:
    suspecting that a pressure sensor offset fault has occurred;
    checking whether the pressure downstream of the tank venting valve is different from the starting pressure;
    integrating the tank venting volume flow during an uninterrupted active tank venting valve actuation until the volume present in the purge line up to the activated carbon filter is reached;
    checking whether the difference between the purge line pressure and the pressure downstream of the tank venting valve is less than a predetermined third threshold value;
    if this is the case, detecting that a functional pressure sensor is present;
    if this is not the case, checking whether the maximum value of the difference between the purge line pressure and the starting pressure is greater than a predetermined fourth threshold value;
    if this is not the case, detecting that a sticking pressure sensor fault has occurred;
    if this is the case, waiting until the tank venting valve is closed for a minimum adjustment time;

checking whether the difference between the purge line pressure and the starting pressure is less than a predetermined fifth threshold value;
if this the case, detecting that a pressure sensor offset fault has occurred; and
if this is not the case, detecting that a pressure sensor offset fault has not occurred.

5. The method of claim 2, wherein the diagnosis algorithm associated with the ambient pressure range determines whether a sticking pressure sensor fault has occurred.

6. The method of claim 5, further comprising: when determining whether a sticking pressure sensor fault has occurred, performing an analysis of one or more events which cause a pressure change in the purge line in the nominal system.

7. The method of claim 5, further comprising: when determining whether a sticking pressure sensor fault has occurred, checking whether a difference between the purge line pressure and the starting pressure is greater than a predetermined sixth threshold value.

8. The method of claim 7, further comprising: when the difference between the purge line pressure and the starting pressure is greater than a predetermined sixth threshold value, detecting that a sticking pressure sensor fault has not occurred.

9. The method of claim 7, further comprising: when the difference between the purge line pressure and the starting pressure is not greater than a predetermined sixth threshold value, detecting that a sticking pressure sensor fault has occurred.

10. A device for pressure sensor diagnosis in a tank ventilation system of a motor vehicle operated by an internal combustion engine, the device comprising:
a control unit (ECU) designed to control the method of claim 1.

11. A method for pressure sensor diagnosis in a tank venting system of a motor vehicle operated by an internal combustion engine, the tank venting system includes an activated carbon filter, a purge line arranged between the activated carbon filter and an intake tract of the motor vehicle, a tank venting valve arranged in the purge line and a pressure sensor arranged in the purge line, the method comprises:
measuring a pressure prevailing in the purge line by the pressure sensor to determine a starting pressure;
classifying the starting pressure into one of a plurality of pressure ranges depending on an amplitude of the starting pressure, the plurality of pressure ranges includes a positive pressure range, an ambient pressure range and a negative pressure range; and
carrying out a pressure sensor diagnosis using a diagnosis algorithm which is associated with the pressure range in which the starting pressure lies,
wherein the diagnosis algorithm associated with the negative pressure range includes:
determining whether the pressure sensor is operating faultlessly or has a pressure sensor offset fault or a sticking pressure sensor fault;
suspecting that a pressure sensor offset fault has occurred;
checking whether the pressure downstream of the tank venting valve is different from the starting pressure;
integrating the tank venting volume flow during an uninterrupted active tank venting valve actuation until the volume present in the purge line up to the activated carbon filter is reached;
checking whether the difference between the purge line pressure and the pressure downstream of the tank venting valve is less than a predetermined third threshold value;
if this is the case, detecting that a functional pressure sensor is present;
if this is not the case, checking whether the maximum value of the difference between the purge line pressure and the starting pressure is greater than a predetermined fourth threshold value;
if this is not the case, detecting that a sticking pressure sensor fault has occurred;
if this is the case, waiting until the tank venting valve is closed for a minimum adjustment time;
checking whether the difference between the purge line pressure and the starting pressure is less than a predetermined fifth threshold value;
if this the case, detecting that a pressure sensor offset fault has occurred; and
if this is not the case, detecting that a pressure sensor offset fault has not occurred.

12. A device for pressure sensor diagnosis in a tank ventilation system of a motor vehicle operated by an internal combustion engine, the device comprising:
a control unit (ECU) designed to control the method of claim 11.

13. A method for pressure sensor diagnosis in a tank venting system of a motor vehicle operated by an internal combustion engine, the tank venting system includes an activated carbon filter, a purge line arranged between the activated carbon filter and an intake tract of the motor vehicle, a tank venting valve arranged in the purge line and a pressure sensor arranged in the purge line, the method comprises:
measuring a pressure prevailing in the purge line by the pressure sensor to determine a starting pressure;
classifying the starting pressure into one of a plurality of pressure ranges depending on an amplitude of the starting pressure, the plurality of pressure ranges includes a positive pressure range, an ambient pressure range and a negative pressure range; and
carrying out a pressure sensor diagnosis using a diagnosis algorithm which is associated with the pressure range in which the starting pressure lies,
wherein the diagnosis algorithm associated with the ambient pressure range includes:
determining whether a sticking pressure sensor fault has occurred by checking whether a difference between the purge line pressure and the starting pressure is greater than a predetermined sixth threshold value; and
when the difference between the purge line pressure and the starting pressure is greater than a predetermined sixth threshold value, detecting that a sticking pressure sensor fault has not occurred.

14. A device for pressure sensor diagnosis in a tank ventilation system of a motor vehicle operated by an internal combustion engine, the device comprising:
a control unit (ECU) designed to control the method of claim 13.

* * * * *